United States Patent [19]

Yamamoto et al.

[11] Patent Number: 4,467,061

[45] Date of Patent: Aug. 21, 1984

[54] WEATHER RESISTANT POLYOLEFIN COMPOSITION

[75] Inventors: Noboru Yamamoto, Tokyo; Masakichi Shimada, Irumagun; Shigeo Yamazaki, Kawagoe; Tsuyoshi Kanai; Kazuo Sei, both of Yokohama; Yoshiro Umemoto, Nagoya, all of Japan

[73] Assignees: Tonen Sekiyu Kagaku Kabushiki Kaisha, Tokyo; Toyota Jidosha Kabushiki Kaisha, Aichi, both of Japan

[21] Appl. No.: 454,184

[22] Filed: Dec. 27, 1982

[30] Foreign Application Priority Data

Dec. 28, 1981 [JP] Japan ................. 56/209895

[51] Int. Cl.$^3$ .................... C08K 5/10; C08K 5/34; C08K 5/29

[52] U.S. Cl. ........................... 524/87; 524/86; 524/99; 524/528; 524/299

[58] Field of Search .............. 524/86, 87, 99, 299

[56] References Cited

U.S. PATENT DOCUMENTS

| | | | |
|---|---|---|---|
| 3,992,390 | 11/1976 | Holt et al. | 524/99 |
| 4,021,432 | 5/1977 | Holt et al. | 524/99 |
| 4,278,590 | 7/1981 | Dexter et al. | 524/99 |
| 4,289,686 | 9/1981 | Rody et al. | 524/99 |
| 4,362,831 | 12/1982 | Ohzeki et al. | 524/99 |

*Primary Examiner*—Carman J. Seccuro
*Attorney, Agent, or Firm*—Wenderoth, Lind & Ponack

[57] ABSTRACT

This invention relates to a polyolefin composition with an improved weather resistance, which comprises a polyolefin blended with (1) a benzotriazole compound, (2) a heterocyclic hindered amine compound and (3) a phenyl benzoate compound or nickel complex compound.

11 Claims, No Drawings

WEATHER RESISTANT POLYOLEFIN COMPOSITION

BACKGROUND OF THE INVENTION

1. Field of the Invention

This invention relates to a polyolefin composition with an improved weather resistance and more particularly, it is concerned with a polyolefin composition whose weather resistance, in particular, at high temperatures is improved by blending with weatherproofing agents in a specified combination.

2. Description of the Prior Art

Polyolefins are very useful for moldings, films, fibers, etc. because of their outstanding mechanical properties, but they tend to be degraded by ultraviolet rays when used outdoors. For the protection thereof from degradation by ultraviolet rays, it is well known to add thereto a stabilizer for weathering, for example, salicyclic acid esters, benzophenone, benzotriazole and nickel chelate compounds.

As polyolefins have lately found wider applications, it has become a popular practice to add synthetic rubbers, inorganic fillers, pigments, etc. for the purpose of improving their mechanical properties, performances and appearance of their moldings so that they meet requirements for the specific applications. The requirement for weather resistance has become more stringent than before and polyolefins are required to resist weathering at high temperatures. In particular, moldings produced from polyolefin compositions blended with these fillers or additives are used in fields where weather resistance is required, but inorganic fillers tend to lower the weather resistance of a polyolefin composition containing them, particularly, at high temperatures. Therefore, it has become ascertained that the above described stabilizers for weathering are not so effective when used in combination with inorganic fillers.

SUMMARY OF THE INVENTION

It is an object of the present invention to provide an improved polyolefin composition with a higher weather resistance.

It is another object of the present invention to provide a polyolefin composition whose weather resistance is improved, in particular, at high temperatures.

These objects can be attained by a polyolefin composition which comprises a polyolefin blended with (1) a benzotriazole compound, (2) a heterocyclic hindered amine compound and (3) a phenyl benzoate compound or nickel complex compound.

DETAILED DESCRIPTION OF THE INVENTION

The inventors have made various efforts to obtain a polyolefin compound with an improved weather resistance at high temperatures and consequently, have found that an excellent weather resistance can be given by adding to a polyolefin a benzotriazole compound, a heterocyclic hindered amine compound and a phenyl benzoate compound or nickel complex compound. The present invention is based on this finding.

Accordingly, the present invention provides a polyolefin composition comprising a polyolefin blended with (1) a benzotriazole compound, (2) a heterocyclic hindered amine compound and (3) a phenyl benzoate compound or nickel complex compound.

The polyolefin used in this invention includes high-pressure process low-density polyethylene, low-pressure process linear low-density polyethylene, medium- and low-pressure process high-density polyethylene, crystalline polypropylene, crystalline ethylene-propylene block or random copolymers containing less than 20 wt% of ethylene, polybutene-1, ethylene-1-butene copolymers, and ethylene-vinyl acetate copolymers containing less than 20 wt% of vinyl acetate, and mixtures thereof.

In addition, the polyolefin composition of this invention may contain synthetic rubber and inorganic fillers.

Preferred synthetic rubber used for the polyolefin composition of this invention is ethylene-α-olefin copolymer rubber, for example, copolymer rubber of ethylene and α-olefin such as propylene, butene-1, and hexene-1; and terpolymer rubber (referred to as EPDM hereinafter) of ethylene-propylene and non-conjugated diene such as ethylidene norbornene and cyclopentadiene. Preferable among them are ethylene-propylene copolymer rubber (referred to as EPR hereinafter) and EDPM.

The preferred inorganic fillers which can be added to the polyolefin composition of this invention include talc, mica, wollastonite, calcium carbonate, barium sulfate, magnesium carbonate, clay, alumina, silica, calcium sulfate, carbon fibers, glass fibers, metal fibers, quartz sand, silicastone, carbon black, titanium oxide, magnesium hydroxide, asbestos, zeolite, diatomaceous earth, sericite, "shirasu", calcium hydroxide, calcium sulfite, sodium sulfate, bentonite, and graphite. Most preferable among them are talc, mica, calcium carbonate, glass fibers, and wollastonite which improve the low-temperature impact resistance, moldability, and paintability.

Polyolefin compositions with improved low-temperature impact resistance, moldability, and paintability can be obtained by mixing 20 to 79 wt% of crystalline polyolefin, 20 to 50 wt% of ethylene-α-olefin copolymer rubber, and 1 to 30 wt% of inorganic filler.

The benzotriazole compound (referred to as compound (I) hereinafter) used for the polyolefin composition of this invention includes, for example, 2-(2'-hydroxy-5'-methylphenyl)benzotriazole,
2-(2'-hydroxy-5'-t-butylphenyl)benzotriazole,
2-(2'-hydroxy-5'-amylphenyl)benzotriazole,
2-(2'-hydroxy-4'-octoxyphenyl)benzotriazole,
2-(2'-hydroxy-3', 5'-di-t-butylphenyl)benzotriazole,
2-(2'-hydroxy-3', 5'-diisoamylphenyl)benzotriazole,
2-(2'-hydroxy-3', 5'-dimethylphenyl)benzotriazole,
2-(2'-hydroxy-3'-t-butyl-5'-methylphenyl)-5-chlorobenzotriazole,
2-(2'-hydroxy-3', 5'-di-t-butylphenyl)-5-chlorobenzotriazole,
2-(2'-hydroxy-3', 5'-dimethylphenyl)-5-chlorobenzotriazole,
and
2-(2'-hydroxy-3', 5'-dichlorophenyl)benzotriazole.

These benzotriazole compounds are added in an amount of 0.01 to 1.0 part by weight, preferably 0.05 to 0.5 part by weight, based on 100 parts by weight of the above-mentioned polyolefin composition.

The heterocyclic hindered amine compound (referred to as compound (II) hereinafter) used for the polyolefin composition of this invention is a six-membered heterocyclic compound containing a hindered amine nitrogen atom and optionally other heteroatoms, preferably nitrogen or oxygen atoms. It includes, for example:

di-(2,2,6,6-tetramethyl-4-piperidyl)sebacate, 4-benzoyloxy-2,2,6,6-tetramethylpiperidine, a condensate of succinic acid and N-(2-hydroxyethyl)-2,2,6,6-tetramethyl-4-hydroxypiperidine, 1,2,3,4-tetra-(2,2,6,6-tetramethyl-4-piperidyl)-butane-tetracarboxylate,1,4-di-(2,2,6,6-tetramethyl-4-piperidyl)-2,3-butanedione, tris-(2,2,6,6-tetramethyl-4-piperidyl)trimellitate, 1,2,2,6,6-pentamethyl-4-piperidylstearate, 1,2,2,6,6-pentamethyl-4-piperidyl-n-octoate, bis-(1,2,2,6,6-pentamethyl-4-piperidyl)-sebacate, tris-(2,2,6,6-tetramethyl-4-piperidyl)-nitrileacetate, 4-hydroxy-2,2,6,6-tetramethylpiperidine, and 4-hydroxy-1,2,2,6,6-pentamethylpiperidine.

Preferable among them are di-(2,2,6,6-tetramethyl-4-piperidyl)sebacate and a condensate of succinic acid and N-(2-hydroxyethyl)-2,2,6,6-tetramethyl-4-hydroxypiperidine. These heterocyclic hindered amine compounds are added in an amount of 0.01 to 1.0 part by weight, preferably 0.05 to 0.5 part by weight, based on 100 parts by weight of the above-mentioned polyolefin composition.

The phenyl benzoate compound (referred to as compound (III) hereinafter) used for the polyolefin composition of this invention includes, for example, phenyl salicylate, p-octlyphenyl salicylate, p-butyl-phenyl salicylate, resorcinol monobenzoate, 2,4-di-t-butylphenyl-3,5-di-t-butyl-4-hydroxybenzoate, and 4-octylphenyl-3,5-di-t-butyl-4-hydroxybenzoate. These phenyl benzoate compounds are added in an amount of 0.01 to 1.0 part by weight, preferably 0.05 to 0.5 part by weight, based on 100 parts by weight of the above-metnioned polyolefin composition.

The nickel complex compound (referred to as compound (IV) hereinafter) used for the polyolefin composition of this invention includes, for example, ]2,2'-thiobis(4-t-octylphenolate)]-n-butylamine nickel (II) and nickel salt of bis-(3,5-di-t-butyl-4-hydroxy-benzylphosphonate). These nickel complex salt compounds are added in an amount of 0.01 to 1.0 part by weight, preferably 0.05 to 0.5 part by weight, based on 100 parts by weight of the above-mentioned polyolefin composition.

The polyolefin composition of this invention is further improved when it is incorporated with a hindered phenol antioxidant and/or thioester antioxidant.

The hindered phenol antioxidant includes, for example, 2,6-di-t-butyl-4-methylphenol, 1,1,3-tri(2-methyl-4-hydroxy-5-t-butylphenyl)butane, tetrakis[methylene(3,5-di-t-butyl-4-hydroxyhydrocinnamic acid ester] methane, n-octadecyl-$\beta$-(4'hydroxy-3',5'-di-t-butylphenyl)propionate, 1,3,5-trimethyl-2,4,6-tri(3,5-di-t-butyl-4 -hydroxybenzyl)benzene, and tris-(3,5-di-t-butyl-4 -hydroxybenzyl)isocyanurate.

The thioester antioxidant includes, for example, dilauryl-thio-dipropionate, distearyl-thio-dipropionate, laurylstearyl-thio-dipropionate, dimyristyl-thio-dipropionate, and tetrakis(methylene-3-dodecyl-thio-propionate)methane.

In addition, the polyolefin composition of this invention may be further incorporated with pigments for improved appearance of the moldings produced therefrom.

The pigments which can be added to the polyolefin composition of this invention include, for example, titanium oxide, carbon black, yellow iron oxide, titanium yellow, Hansa yellow, Benzidine yellow, red iron oxide, permanent red, thioindigo red, thioindigo maroon, manganese violet, dioxazine violet, ultramarine, phthalocyanine blue, phthalocyanine green, isoindolenone yellow, quinophthalone yellow, condensed azo yellow, perinone orange, quinacridone red, quinacridone scarlet, perylene red, perylene scarlet condensed azo red, indanthrone blue and Cinquacia red.

These pigments are dispersed with the aid of a dispersing agent, for example, metal soaps such as calcium stearate and magnesium stearate and polyolefin waxes such as polyethylene wax and polypropylene wax. For improved dispersion, a polyolefin wax should preferably be mixed previously with a pigment using a ball mill or the like.

The polyolefin composition of this invention may be blended with a proper anti-static agent, neutralizing agent, blowing agent, anti-foaming agent, flame-retardant, cross-linking agent, etc.

The polyolefin composition of this invention can be prepared by mixing the necessary components in a heated molten state using common mixing equipment such as single-screw extruder, twin-screw extruder, Banbury mixer, Brabender, and kneader.

The polyolefin composition of this invention is superior in injection-moldability and mold release. It can also be used for extrusion molding and blow molding. The resulting moldings are superior in low-temperature impact resistance, dimensional stability, and weather resistance. They are particularly suitable for automobile bumpers.

The invention is described in detail with reference to the following examples. Percent (%) in the examples means percent by weight. Test methods used in the examples are given below.

(1) MI: In accordance with ASTM D-1238

(2) Flexural modulus of elasticity: In accordance with ASTM D-790

(3) Izod impact strength: In accordance with ASTM D-256 (Test piece with a thickness of 3.2 mm and notch)

(4) Molding shrinkage: Determined by measuring sheet specimens, 350×100×3 mm in original size, after standing for 20° C. for 24 hours.

(5) Film peel strength: Coating specimens were prepared by applying a primer of chlorinated polypropylene and urethane top paint, followed by baking, onto sheets measuring 70×120×3 mm. The coating film was peeled at 180° in a 10 mm width using an Instron universal tester.

(6) Weatherproofing time: Injection-molded specimens measuring 70×30×30 mm were subjected to accelerated weatherproofing test using a sunshine weather-o-meter (black panel temperature: 83° C., spray/dry cycle: 18 min/102 min) until cracks occur on the surface of the specimen.

Example 1

One hundred parts by weight of a mixture composed of 60 wt% of crystalline ethylene-propylene block copolymer (containing 7 wt% of ethylene and having an MI of 9.0), 30 wt% of EPR (containing 75 wt% of ethylene and having a Mooney viscosity of 70), and 10 wt% of talc (having an average particle diameter of 25 μm) was blended with 0.1 part by weight of 2,6-di-t-butyl-4-methylphenol using a high-speed mixer. The resulting mixture was melted and mixed using a twin-screw extruder at a cylinder temperature of 200° to 250° C., and pelletized. The resulting pellets were molded into test specimens by injection at a molding temperature of 230° C. under an injection pressure of 900 kg/cm². The test specimens were found to have a flexural modulus of elasticity of 9000 kg/cm², an Izod impact stength of 80 kg-cm/cm (at 20° C.) and 65 kg-cm/cm (at −30° C.), a molding shrinkage of 0.7%, and a coating film peel strength of 1,300 g/10 mm. These results indicate that the composition prepared in this example is superior in low-temperature impact strength, molding dimensional stability, and paint-ability.

One hundred parts by weight of the composition prepared as above was blended by dry process with weatherproofing agents, antioxidant, pigment, and dispersing agent in quantities as shown in Table 1, and the mixture was melted, kneaded, and pelletized using a single-screw extruder. The resulting pellets were molded into a sheet by injection molding at a molding temperature of 230° C. under an injection pressure of 900 kg/cm². From the sheet were cut test specimens (70×30×3 mm) for weatherproofing. The test specimens were subjected to accelerated weatherproofing test using a sunshine weather-o-meter. The results are shown in Table 1. (Experiment Nos. 1 to 11)

For comparison, Table 1 shows the results obtained with compositions which do not contain the weatherproofing agents as specified in this invention. (Experiment Nos. 12 to 17).

TABLE 1

| Experiment No. | Weatherproofing Agents | | | | | | | | Antioxidant | | Pigment | | Dispersing agent | | Weatherproofing time (hour) |
|---|---|---|---|---|---|---|---|---|---|---|---|---|---|---|---|
| | Compd (I) | | Compd (II) | | Compd (III) | | Compd (IV) | | | | | | | | |
| | Type | Part | Type | Part | Type | Part | Type | Part | Type | Part | Type | Part | Type | Part | |
| 1 | B-1 | 0.2 | H-1 | 0.2 | P-2 | 0.2 | — | — | A-1 | 0.1 | Phthalocyanine blue | 0.1 | Polyethylene wax | 0.3 | 1,000 |
| 2 | B-1 | 0.2 | H-1 | 0.2 | P-2 | 0.5 | — | — | A-1 | 0.1 | Phthalocynanine blue | 0.1 | Polyethyene wax | 0.3 | 1,600 |
| 3 | B-1 | .02 | H-1 | 0.2 | — | — | N-1 | 0.3 | A-1 | 0.1 | Phthalocynanine blue | 0.1 | Polyethylene wax | 0.3 | 1,300 |
| 4 | B-2 | 0.2 | H-1 | 0.2 | P-2 | 0.4 | — | — | A-2 | 0.1 | Titanium yellow | 0.3 | Polyethylene wax | 0.3 | 1,400 |
| 5 | B-2 | 0.2 | H-1 | 0.2 | P-2 | 0.4 | — | — | A-2 | 0.1 | Red iron oxide | 0.3 | Polyethylene wax | 0.3 | 1,500 |
| 6 | B-2 | 0.2 | H-1 | 0.2 | P-2 | 0.4 | — | — | A-2 | 0.1 | Cinquacia red | 0.1 | Polyethylene wax | 0.3 | 1,300 |
| 7 | B-2 | 0.2 | H-1 | 0.2 | P-2 | 0.4 | — | — | A-2 | 0.1 | Phthalocyanine gray | 0.1 | Polyethylene wax | 0.3 | 1,500 |
| 8 | B-2 | 0.2 | H-2 | 0.2 | — | — | N-1 | 0.4 | A-3 | 0.1 | Titanium yellow | 0.3 | Polypropylene wax | 0.3 | 1,450 |
| 9 | B-2 | 0.2 | H-2 | 0.2 | — | — | N-1 | 0.4 | A-3 | 0.1 | Red iron oxide | 0.3 | Polypropylene wax | 0.3 | 1,600 |
| 10 | B-2 | 0.2 | H-2 | 0.2 | — | — | N-1 | 0.4 | A-3 | 0.1 | Cinquacia red | 0.1 | Polypropylene wax | 0.3 | 1,400 |
| 11 | B-2 | 0.2 | H-2 | 0.2 | — | — | N-1 | 0.4 | A-3 | 0.1 | Phthalocyanine blue | 0.1 | Polypropylene wax | 0.3 | 1,550 |
| 12* | B-2 | 0.2 | — | — | P-2 | 0.4 | — | — | A-2 | 0.1 | Phthalocynanine blue | 0.1 | Polyethylene wax | 0.3 | 500 |
| 13* | B-2 | 0.2 | H-1 | 0.4 | — | — | — | — | A-2 | 0.1 | Phthalocyanine blue | 0.1 | Polyethylene wax | 0.3 | 400 |
| 14* | B-2 | 0.2 | — | — | — | — | N-1 | 0.4 | A-2 | 0.1 | Phthalocyanine blue | 0.1 | Polyethylene wax | 0.3 | 550 |
| 15* | — | — | H-2 | 0.2 | P-1 | 0.4 | — | — | A-3 | 0.1 | Phthalocyanine blue | 0.1 | Polyethylene wax | 0.3 | 550 |
| 16* | — | — | H-2 | 0.2 | — | — | N-1 | 0.4 | A-3 | 0.1 | Phthalocyanine blue | 0.1 | Polyethylene wax | 0.3 | 550 |
| 17* | B-1 | 0.2 | — | — | — | — | — | — | A-1 | 0.1 | Phthalocynanine | 0.1 | Polyethylene wax | 0.3 | 200 |

TABLE 1-continued

| Experiment No. | Weatherproofing Agents | | | | | | | | Antioxidant | | Pigment | | Dispersing agent | | Weatherproofing time (hour) |
| --- | --- | --- | --- | --- | --- | --- | --- | --- | --- | --- | --- | --- | --- | --- | --- |
| | Compd (I) | | Compd (II) | | Compd (III) | | Compd (IV) | | | | | | | | |
| | Type | Part | Type | Part | Type | Part | Type | Part | Type | Part | Type | Part | Type | Part | |
| | | | | | | | | | | | blue | | | | |

*Comparative Examples; Part by weight

Notes to Table 1
Compound (I)
B-1: 2-(2'-hydroxy-3't-butyl-5-methylphenyl)-5-chlorobenzotriazole
B-2: 2-(2'-hydroxy-3',5'-di-t-butylphenyl)-5-chlorobenzotriazole
Compound (II)
H-1: di-(2,2,6,6,-tetramethyl-4-piperidyl)sebacate
H-2: condensate of succinic acid and N—(2-hydroxy-ethyl)-2,2,6,6-tetramethyl-4-hydroxy-piperidine
Compound (III)
P-1: resorcinol monobenzoate
P-2: 2,4-di-t-butylphenyl-3,5-di-t-butyl-4-hydroxy-benzoate
Compound (IV)
N-1: nickel salt of bis(3,5-di-t-butyl-4-hydroxy-benzylphosphonate)
N-2: [2,2'-thiobis(4-t-octylphenolate)]-n-butylamine nicklel (II)
Anti-oxidant
A-1: n-octadecyl-3-(4'-hydroxy-3',5'-di-t-butyl-phenol)propionic acid ester
A-2: tetrakis(methylene-3-dodecyl-thio-propionic acid ester)methane
A-3: tris(3,5-di-t-butyl-4-hydroxybenzyl)isocyanurate

Example 2

One hundred parts by weight of a mixture composed of 60 wt% of crystalline ethylene-propylene block copolymer (containing 7 wt% of ethylene and having an MI of 15.0), 30 wt% of EPR (containing 75 wt% of ethylene and having a Mooney viscosity of 70), and 10 wt% of talc (having an average particle diameter of 10 μm) was blended with 0.1 part by weight of 2,6-di-t-butyl-4-methylphenol, and the resulting mixture was melted, mixed, and pelletized in the same manner as in Example 1. The resulting pellets were molded into test specimens as in Example 1. The test specimens were found to have a flexural modulus of elasticity of 9500 kg/cm$^2$, an Izod impact strength of 78 kg-cm/cm (at 20° C.) and 65 kg-cm/cm (at −30° C.), a molding shrinkage of 0.7%, and a coating film peel strength of 1,300 g/10 mm. One hundred parts by weight of the composition prepared as above was blended by dry process with weatherproofing agents, antioxidant, pigment, and idspersing agent in quantities as shown in Table 2, and test specimens were prepared as in Example 1. The test specimens were sujbected to accelerated weatherproofing test using a sunshine weather-o-meter. The results are shown in Table 2. (Experiment Nos. 18 to 19)

Example 3

One hundred parts by weight of a mixture composed of 60 wt% of crystalline ethylene-propylene random copolymer (containing 2 wt% of ethylene and having an MI of 15.0), 30 wt% of EPDM (containing 50 wt% of ethylene and having a Mooney viscosity of 105), and 10 wt% of talc (having an average particle diameter of 10 μm) was blended with 0.1 part by weight of 2,6-di-t-butyl-4-methylphenol, and the resulting mixture was treated and molded into test specimens as in Example 1. The test specimens were found to have a flexural modulus of elasticity of 9000 kg/cm$^2$, an Izod impact strength of 70 kg-cm/cm (at 20° C.) and 40 kg-cm/cm (at −30° C.), a molding shrinkage of 0.7%, and a coating film peel strength of 1,200 g/10 mm.

One hundred parts by weight of the composition prepared as above was blended by dry process with weather-proofing agents, antioxidant, pigment, and dispersing agent in quantities as shown in Table 2, and test specimens were prepared as in Example 1. The test specimens were subjected to accelerated weatherproofing test using a sunshine weather-o-meter. The results are shown in Table 2. (Experiment Nos. 20 to 21)

Example 4

One hundred parts by weight of a mixture composed of 60 wt% of homopolypropylene (having an MI of 15.0), 30 wt% of EPDM (containing 50 wt% of ethylene and having a Mooney viscosity of 105), and 10 wt% of talc (having an average particle diameter of 10 μm) was incorporated with 0.1 part by weight of 2,6-di-t-butyl-4-methylphenol, and the resulting mixture was treated and molded into test specimens as in Example 1. The test specimens were found to have a flexural modulus of elasticity of 1200 kg/cm$^2$, an Izod impact strength of 60 kg-cm/cm (at 20° C.) and 35 kg-cm/cm (at −30° C.), a molding shrinkage of 0.7%, and a coating film peel strength of 1,050 g/10 mm.

One hundred parts by weight of the composition prepared as above was mixed by dry process with weatherproofing agents, antioxidant, pigment, and dispersing agent in quantities as shown in Table 2, and test specimens were prepared as in Example 1. The test specimens were subjected to accelerated weatherproofing test using a sunshine weather-o-meter. The results are shown in Table 2. (Experiment Nos. 22 to 23)

TABLE 2

| Experiment No. | Weatherproofing Agents | | | | | | | | Antioxidant | | Pigment | | Dispersing agent | | Weatherproofing time (hour) |
| --- | --- | --- | --- | --- | --- | --- | --- | --- | --- | --- | --- | --- | --- | --- | --- |
| | Compd (I) | | Compd (II) | | Compd (III) | | Compd (IV) | | | | | | | | |
| | Type | Part | Type | Part | Type | Part | Type | Part | Type | Part | Type | Part | Type | Part | |
| 18 | B-1 | 0.1 | H-1 | 0.1 | P-2 | 0.1 | — | — | A-2 | 0.1 | Quinophthalone yellow | 0.1 | Polypropylene wax | 0.3 | 700 |
| 19 | B-1 | 0.2 | H-1 | 0.2 | P-2 | 0.2 | — | — | A-2 | 0.1 | Isoindolenone yellow | 0.1 | Polypropylene wax | 0.3 | 900 |
| 20 | B-1 | 0.1 | H-1 | 0.1 | — | — | N-2 | 0.1 | A-3 | 0.1 | Phthalo- | 0.1 | Polyprop- | 0.3 | 750 |

TABLE 2-continued

| Experiment No. | Weatherproofing Agents | | | | | | | | Anti-oxidant | | Pigment | | Dispersing agent | | Weatherproofing time (hour) |
|---|---|---|---|---|---|---|---|---|---|---|---|---|---|---|---|
| | Compd (I) | | Compd (II) | | Compd (III) | | Compd (IV) | | | | | | | | |
| | Type | Part | Type | Part | Type | Part | Type | Part | Type | Part | Type | Part | Type | Part | |
| 21 | B-1 | 0.2 | H-1 | 0.1 | — | — | N-2 | 0.2 | A-3 | 0.1 | cynanine blue Phthalocynanine blue | 0.1 | ylene wax Polypropylene wax | 0.3 | 1,000 |
| 22 | B-2 | 0.2 | H-2 | 0.2 | P-1 | 0.2 | — | — | A-1 | 0.1 | Carbon black/ titanium oxide | 0.1/ 0.3 | Polyethylene wax | 0.3 | 1,000 |
| 23 | B-2 | 0.2 | H-2 | 0.2 | — | — | N-1 | 0.2 | A-1 | 0.1 | Carbon black/ titanium oxide | 0.1/ 0.3 | Polyethylene wax | 0.3 | 1,200 |

Example 5

One hundred parts by weight of a mixture composed of crystalline ethylene-propylene block copolymer (containing 7 wt% of ethylene and having an MI of 9.0), medium and low pressure process high density polyethylene EPR (containing 75 wt% of ethylene and having a Mooney viscosity of 70), and talc (having an average particle diameter of 25 μm) in quantities as shown in Table 3 was blended with 0.1 part by weight of 2,6-di-t-butyl-4-methylphenol, and the resulting mixture was melted, mixed, and pelletized using a twin-screw kneader at a cylinder temperature of 200° to 250° C. The resulting pellets were molded into test specimens by injection molding at a molding temperature of 230° C. under an injection pressure of 900 kg/cm². The test specimens were found to have flexural modulus of elasticity, Izod impact strength, molding shrinkage, and coating film peel strength as shown in Table 3.

One hundred parts by weight of the composition prepared as above was mixed by dry process with weatherproofing agents, antioxidant, pigment, and dispersing agent in quantities as shown in Table 3, and test specimens were prepared as in Example 1. The test specimens were subjected to accelerated weatherproofing test using a sunshine weather-o-meter. The results are shown in Table 3. (Experiment Nos. 24 to 26)

Example 6

One hundred parts by weight of high-pressure process low-density polyethylene (density: 0.912, MI: 9.0), low-pressure process linear polyethylene (density: 0.924, MI: 12.0), medium and low-pressure process high-density polyethylene (density: 0.956, MI: 0.3), crystalline homopolypropylene (MI: 9.0), ethylene-propylene block copolymer (ethylene content: 7.0 wt%, MI: 15.0), EPR (ethylene content: 75 wt%, Mooney viscosity: 70), and EPDM (ethylene content: 50 wt%, third component: ethylidenenorbornene, Mooney viscosity: 105), alone or in combination, was mixed with 0.1 part by weight of 2,6-di-t-butyl-4-methylphenol. The mixture was further mixed by dry process with weatherproofing agent, anti-oxidant, pigment, and dispersing agent in quantities as shown in Table 4, and 0.3 part of polypropylene wax as dispersing agent. Test specimens were prepared as in Example 1 and subjected to weatherproofing test using a sunshine weather-o-meter. The results are shown in Table 4. (Experiment Nos. 37 to 44)

For comparison, Table 4 also shows the results obtained with the compositions which do not contain the weatherproofing agents as specified in this invention. (Experiment Nos. 45 to 49)

TABLE 3

| Experiment No. | | 24 | 25 | 26 |
|---|---|---|---|---|
| Ethylene-propylene block copolymer (wt %) | | 60 | 60 | 100 |
| Medium and low-pressure process high-density polyethylene (wt %) | | — | 10 | — |
| EPR (wt %) | | 10 | 30 | — |
| Talc (wt %) | | 30 | — | — |
| Weatherproofing agents | | | | |
| Compd (I) | (part by weight) | B-1 (0.2) | B-1 (0.2) | B-1 (0.2) |
| Compd (II) | (part by weight) | H-1 (0.2) | H-2 (0.2) | H-2 (0.2) |
| Compd (IV) | (part by weight) | N-1 (0.2) | N-2 (0.2) | N-1 (0.2) |
| Anti-oxidant | (part by weight) | A-1 (0.1) | A-1 (0.1) | A-1 (0.1) |
| Pigment | (part by weight) | Phthalocyanine blue (0.1) | Titanium yellow (0.3) | Red iron oxide (0.3) |
| Dispersing agent | (part by weight) | Polyethylene wax (0.3) | Polypropylene wax (0.3) | Polypropylene wax (0.3) |
| Flexural modulus of elasticity | | 19,500 | 6,500 | 11,000 |
| Izod impact strength | | | | |
| kg/cm at 20° C. | | 12 | 70 | 7 |
| kg-cm/cm at −30° C. | | 3 | 40 | 4 |
| Molding shrinkage (%) | | 0.8 | 1.6 | 1.8 |
| Film peel strength (g/10 mm) | | 600 | 900 | 300 |
| Weatherproofing time (hour) | | 1,600 | 1,900 | 1,800 |

TABLE 4

| Experiment No. | 37 | 38 | 39 | 40 | 41 | 42 | 43 | 44 | 45* | 46* | 47* | 48* | 49* |
|---|---|---|---|---|---|---|---|---|---|---|---|---|---|
| High-pressure process low-density polyethylene (wt %) | 100 | — | — | — | — | — | — | — | — | — | — | — | — |
| Low-pressure process linear polyethylene (wt %) | — | 100 | — | — | — | — | — | — | — | — | — | — | — |
| Medium and low-pressure process high-density polyethylene (wt %) | — | — | 100 | — | — | — | 10 | — | — | — | — | — | — |
| Crystalline homopolypropylene (wt %) | — | — | — | 100 | — | 80 | — | — | — | — | — | — | — |
| Ethylene-propylene block copolymer (wt %) | — | — | — | — | 80 | — | 70 | 100 | 100 | 100 | 100 | 100 | 100 |
| EPR (wt %) | — | — | — | — | 20 | — | 20 | — | — | — | — | — | — |
| EPDM (wt %) | — | — | — | — | — | 20 | — | — | — | — | — | — | — |
| Weatherproofing agents | | | | | | | | | | | | | |
| Compd (I) (wt parts) | B-2 (0.2) | B-2 (02.) | B-2 (0.2) | B-2 (0.2) | B-2 (0.2) | B-2 (0.2) | B-2 (0.2) | B-2 (0.2) | B-2 (0.2) | B-2 (0.2) | B-2 (0.2) | B-2 (0.2) | — |
| Compd (II) (wt parts) | H-2 (0.2) | H-2 (0.2) | H-2 (0.2) | H-2 (0.2) | H-2 (0.2) | H-2 (0.2) | H-2 (0.2) | H-2 (0.3) | — | — | H-2 (0.4) | — | — |
| Compd (III) (wt parts) | P-2 (0.2) | P-2 (0.2) | P-2 (0.2) | — | — | — | — | — | — | P-2 (0.2) | — | — | — |
| Compd (IV) (wt parts) | — | — | — | N-1 (0.2) | N-1 (0.2) | N-1 (0.2) | N-1 (0.2) | N-1 (0.2) | — | — | — | N-2 (0.4) | — |
| Anti-oxidant (wt parts) | A-1 (0.1) | A-1 (0.1) | A-1 (0.1) | A-1 (0.1) | A-1 (0.1) | A-1 (0.1) | A-1 (0.1) | A-1 (0.1) | A-1 (0.1) | A-1 (0.1) | A-1 (0.1) | A-1 (0.1) | A-1 (0.1) |
| Pigment (wt parts) | PCB (0.1) | PCB (0.1) | IIY (0.1) | IIY (0.1) | RIO (0.3) | TY (0.3) | TY (0.3) | RIO (0.3) | PCB (0.1) | PCB (0.1) | PCB (0.1) | PCB (0.1) | PCB (0.1) |
| Weatherproofing time (hour) | 2400 | 2500 | 2300 | 1800 | 1400 | 1800 | 1900 | 1800 | 400 | 850 | 900 | 450 | 100 |

Key:
PCB: Phthalocyanine blue
IIY: Isoindolenone yellow
RIO: Red iron oxide
TY: Titanium yellow
*Comparative Examples

Example 7

One hundred parts by weight of a mixture composed of 55 wt% of homopolypropylene (MI: 15.0), 35 wt% of EPDM (ethylene content: 50 wt%, third component: ethylidenenorbornene, Mooney viscosity: 105), and 10 wt% of talc, mica, calcium carbonate, glass fibers, or wollastonite was mixed with 0.1 part by weight of 2,6-di-t-butyl-4-methylphenol. The mixture was further mixed by dry process with weatherproofing agents in quantities shown in Table 5, 0.1 part by weight of antioxidant A-1, 0.1 part by weight of phthalocyanine blue as pigment, and 0.3 part of polyethylene wax as dispersing agent. Test specimens were prepared as in Example 1 and subjected to weatherproofing test using a sunshine weather-o-meter. The results are shown in Table 5. (Experiment Nos. 27 to 36)

Example 8

One hundred parts by weight of a mixture composed of 80 wt% of medium and low-pressure process high-density polyethylene (density: 0.925, MI: 5.0) or ethylene-propylene block copolymer (ethylene content: 7 wt%, MI: 15.0), and 20 wt% of talc, mica, calcium carbonate, glass fibers, or wollastonite was mixed with 0.1 part by weight of 2,6-di-t-butyl-4-methylphenol. The mixture was further mixed by dry process with weatherproofing agents in quantities shown in Table 6, 0.1 part by weight of antioxidant A-1, 0.1 part by weight of phthalocyanine blue as pigment, and 0.3 part of polyethylene wax as dispersing agent. Test specimens were prepared as in Example 1 and subjected to weatherproofing test using a sunshine weather-o-meter. The results are shown in Table 6. (Experiment Nos. 37 to 46)

TABLE 5

| Experiment No. | Inorganic fillers | Compd (I) Type | Compd (I) Part | Compd (II) Type | Compd (II) Part | Compd (III) Type | Compd (III) Part | Compd (IV) Type | Compd (IV) Part | Weatherproofing time (hour) |
|---|---|---|---|---|---|---|---|---|---|---|
| 27 | Talc | B-1 | 0.2 | H-1 | 0.2 | P-1 | 0.2 | — | — | 1,000 |
| 28 | Talc | B-1 | 0.2 | H-1 | 0.2 | — | — | N-1 | 0.2 | 1,200 |
| 29 | Mica | B-1 | 0.2 | H-1 | 0.2 | P-1 | 0.2 | — | — | 1,500 |
| 30 | Mica | B-1 | 0.2 | H-1 | 0.2 | — | — | N-1 | 0.2 | 1,300 |
| 31 | Calcium carbonate | B-1 | 0.2 | H-1 | 0.2 | P-1 | 0.2 | — | — | 900 |
| 32 | Calcium carbonate | B-1 | 0.2 | H-1 | 0.2 | — | — | N-1 | 0.2 | 1,000 |
| 33 | Glass fibers | B-1 | 0.2 | H-1 | 0.2 | P-1 | 0.2 | — | — | 1,200 |
| 34 | Glass fibers | B-1 | 0.2 | H-1 | 0.2 | — | — | N-1 | 0.2 | 1,250 |
| 35 | Wollastonite | B-1 | 0.2 | H-1 | 0.2 | P-1 | 0.2 | — | — | 1,150 |
| 36 | Wollastonite | B-1 | 0.2 | H-1 | 0.2 | — | — | N-1 | 0.2 | 1,300 |

TABLE 6

| Experiment No. | Polyolefin | Inorganic fillers | Weatherproofing Agents | | | | | | | | Weatherproofing time (hour) |
|---|---|---|---|---|---|---|---|---|---|---|---|
| | | | Compd (I) | | Compd (II) | | Compd (III) | | Compd (IV) | | |
| | | | Type | Part | Type | Part | Type | Part | Type | Part | |
| 37 | Medium and low-pressure process high-density polyethylene | Talc | B-1 | 0.2 | H-1 | 0.2 | P-1 | 0.2 | — | — | 1,600 |
| 38 | Medium and low-pressure process high-density polyethylene | Mica | B-1 | 0.2 | H-1 | 0.2 | P-1 | 0.2 | — | — | 1,550 |
| 39 | Medium and low-pressure process high-density polyethylene | Calcium carbonate | B-1 | 0.2 | H-1 | 0.2 | P-1 | 0.2 | — | — | 1,250 |
| 40 | Medium and low-pressure process high-density polyethylene | Glass fibers | B-1 | 0.2 | H-1 | 0.2 | P-1 | 0.2 | — | — | 1,600 |
| 41 | Medium and low-pressure process high-density polyethylene | Wolalstonite | B-1 | 0.2 | H-1 | 0.2 | P-1 | 0.2 | — | — | 1,550 |
| 42 | Ethylene-propylene block copolymer | Talc | B-1 | 0.2 | H-1 | 0.2 | — | — | N-1 | 0.2 | 1,200 |
| 43 | Ethylene-propylene block copolymer | Mica | B-1 | 0.2 | H-1 | 0.2 | — | — | N-1 | 0.2 | 1,250 |
| 44 | Ethylene-propylene block copolymer | Calcium carbonate | B-1 | 0.2 | H-1 | 0.2 | — | — | N-1 | 0.2 | 950 |
| 45 | Ethylene-propylene block copolymer | Glass fibers | B-1 | 0.2 | H-1 | 0.2 | — | — | N-1 | 0.2 | 1,300 |
| 46 | Ethylene-propylene block copolymer | Wollastonite | B-1 | 0.2 | H-1 | 0.2 | — | — | N-1 | 0.2 | 1,300 |

What is claimed is:

1. A polyolefin composition comprising a polyolefin containing 20–79 wt% of crystalline polyolefin, 20 to 50 wt% of ethylene-α-olefin copolymer rubber and 1 to 30 wt% of inorganic filler blended with (1) at least one benzotriazole compound, (2) at least one heterocyclic hindered amine compound and (3) at least one of phenyl benzoate compound or nickel complex compound.

2. The polyolefin composition of claim 1, wherein the polyolefin is crystalline polypropylene.

3. The polyolefin composition of claim 1, wherein the ethylene-α-olefin copolymer rubber is selected from the group consisting of ethylene-propylene copolymers, ethylene-butene-1 copolymers and ethylene-hexene-1 copolymers.

4. The polyolefin composition of claim 1, wherein 100 parts by weight of a polyolefin is blended with 0.01 to 1 part by weight of a benzotriazole compound, 0.01 to 1 part by weight of a heterocyclic hindered amine compound and 0.01 to 1 part by weight of a phenyl benzoate compound or nickel complex compound.

5. The polyolefin composition of claim 1, wherein the inorganic filler is selected from the group consisting of talc, mica, wollastonite, calcium carbonate, barium sulfate, magnesium carbonate, clay, alumina, silica, calcium sulfate, carbon fibers, glass fibers, metal fibers, quartz sand, silicastone, carbon black, titanium oxide, magnesium hydroxide, asbestos, zeolite, molybdenum, diatomaceous earth, sericite, shirasu, calcium hydroxide, calcium sulfite, sodium sulfate, bentonite and graphite.

6. The polyolefin composition of claim 1, wherein the benzotriazole compounds are 2-(2'-hydroxy-5'-methylphenyl)benzotriazole, 2-(2'-hydroxy-5'-t-butylphenyl)benzotriazole, 2-(2'-hydroxy-5'-amylphenyl)benzotriazole, 2-(2'-hydroxy-4'-octoxyphenyl)benzotriazole, 2-(2'-hydroxy-3',5'-di-t-butylphenyl)benzotriazole, 2-(2'-hydroxy-3',5'-diisoamylphenyl)benzotriazole, 2-(2'-hydroxy-3',5'-dimethylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotraizole, 2-(2'-hydroxy-3',5'-dimethylphenyl)-5-chlorobenzotriazole and 2-(2'-hydroxy-3',5'-dichlorophenyl)benzotriazole.

7. The polyolefin composition of claim 1, wherein the heterocyclic hindered amine compounds are di-(2,2,6,6-tetramethyl-4-piperidyl)sebacate, 4-benzoyloxy-2,2,6,6-tetramethylpiperidine, a condensate of succinic acid and N-(2-hydroxyethyl)-2,2,6,6-tetramethyl-4-hydroxypiperidine, 1,2,3,4-tetra-(2,2,6,6-tetramethyl-4-piperidyl)-butanetetracarboxylate, 1,4-di-(2,2,6,6-tetramethyl-4-piperidyl)-2,3-butanedione, tris-(2,2,6,6-tetramethyl-4-piperidyl)-trimellitate, 1,2,2,6-pentamethyl-4-piperidylstearate, 1,2,2,6,6-pentamethyl-4-piperidyl-n-octoate, bis-(1,2,2,6,6-pentamethyl-4-piperidyl)sebacate, tris-(2,2,6,6-tetramethyl-4-piperidyl)nitrileacetate, 4-hydroxy-2,2,6,6-tetramethylpiperidine and 4-hydroxy-1,2,2,6,6-pentamethylpiperidine.

8. The polyolefin composition of Claim 1, wherein the phenyl benzoate compounds are phenyl salicylate, p-octylphenyl salicylate, p-butylphenyl salicylate, resorcinol monobenzoate, 2,4-di-t-butylphenyl-3,5-di-t-butyl-4-hydroxybenzoate and 4-octylphenyl-3,5-di-t-butyl-4-hydroxybenzoate.

9. The polyolefin composition of claim 1, wherein the nickel complex compounds are [2,2'-thiobis(4-t-octylphenolate)-n-butylamine nickel] (II) and nickel salt of bis-(3,5-di-t-butyl-4-hydroxybenzylphosphonate).

10. The polyolefin composition of claim 1, wherein the polyolefin further contains at least one member from hindered phenol antioxidants and thioester antioxidants.

11. The polyolefin composition of claim 1, wherein the polyolefin further contains at least one member from inorganic pigments and organic pigments.

* * * * *